United States Patent [19]

Mafoti et al.

[11] Patent Number: 5,324,773

[45] Date of Patent: Jun. 28, 1994

[54] STABILIZATION OF RIM SYSTEMS CONTAINING ACIDIC ADDITIVES

[75] Inventors: Robson Mafoti, Pittsburgh; David D. Steppan, Gibsonia; Michael F. Hurley, Oakdale; Albert Magnotta, Monaca, all of Pa.

[73] Assignee: Miles Inc., Pittsburgh, Pa.

[21] Appl. No.: 159,895

[22] Filed: Dec. 1, 1993

Related U.S. Application Data

[63] Continuation-in-part of Ser. No. 965,139, Oct. 22, 1992.

[51] Int. Cl.$^5$ .................. C08K 5/17; C08G 18/18; C08J 9/00; B29C 45/00
[52] U.S. Cl. .................... 524/714; 524/871; 521/51; 521/129; 521/163; 521/170; 521/172; 521/174; 528/53; 528/68; 528/76; 528/80; 528/83; 528/85; 264/53; 264/54; 264/328.1; 264/328.2; 264/328.6; 264/328.8
[58] Field of Search ............... 524/714, 871; 521/51, 521/129, 163, 170, 172, 174; 528/53, 68, 76, 80, 83, 85; 264/53, 54, 328.1, 328.2, 328.6, 328.8

[56] References Cited

U.S. PATENT DOCUMENTS

| | | | |
|---|---|---|---|
| 3,726,952 | 4/1973 | Boden et al. | 264/48 |
| 3,925,527 | 12/1975 | Kleimann et al. | 264/53 |
| 4,058,492 | 11/1977 | von Bonin et al. | 521/110 |
| 4,098,731 | 7/1978 | von Bonin et al. | 521/51 |
| 4,111,861 | 9/1978 | Godlewski | 521/123 |
| 4,143,003 | 3/1979 | Haas et al. | 528/53 |
| 4,201,847 | 5/1980 | Kleimann et al. | 521/172 |
| 4,248,930 | 2/1981 | Haas et al. | 528/53 |
| 4,254,228 | 3/1981 | Kleimann et al. | 521/128 |
| 4,331,778 | 5/1982 | Sommerfeld et al. | 528/53 |
| 4,519,965 | 5/1985 | Taylor et al. | 264/51 |
| 4,581,386 | 4/1986 | Taylor et al. | 521/125 |
| 4,581,387 | 4/1986 | Werner et al. | 521/128 |
| 4,585,803 | 4/1986 | Nelson et al. | 521/124 |
| 4,731,392 | 3/1988 | Streu et al. | 528/83 |
| 4,778,830 | 10/1988 | Streu et al. | 528/83 |
| 4,798,851 | 1/1989 | Werner et al. | 528/83 |
| 4,868,224 | 9/1989 | Harasin et al. | 521/124 |
| 4,876,019 | 10/1989 | Meyer et al. | 528/76 |
| 4,954,537 | 9/1990 | Sanns, Jr. | 521/157 |
| 5,008,033 | 4/1991 | Meyer et al. | 521/124 |
| 5,028,684 | 7/1991 | Neuhaus et al. | 528/76 |
| 5,039,713 | 8/1991 | Petrella | 521/129 |
| 5,137,966 | 8/1992 | Nodelman | 524/772 |
| 5,158,607 | 10/1992 | Mafoti et al. | 106/243 |
| 5,162,386 | 11/1992 | Coppola et al. | 521/129 |

FOREIGN PATENT DOCUMENTS

| | | | |
|---|---|---|---|
| 0004309 | 10/1979 | European Pat. Off. | 521/129 |
| 0411432 | 2/1991 | European Pat. Off. | 528/53 |
| 52-798 | 1/1977 | Japan | 521/129 |
| 1104611 | 4/1989 | Japan | 521/129 |
| 3188120 | 8/1991 | Japan | 528/53 |
| 1365215 | 8/1974 | United Kingdom | |

Primary Examiner—John Kight, III
Assistant Examiner—Rabon Sergent
Attorney, Agent, or Firm—Joseph C. Gil; N. Denise Brown

[57] ABSTRACT

Products made using the RIM process where the reaction mixture contains an acidic release agent have improved green strength when the reaction mixture also contains a peralkylated polyalkylene polyamine.

3 Claims, No Drawings

STABILIZATION OF RIM SYSTEMS CONTAINING ACIDIC ADDITIVES

CROSS REFERENCE TO RELATED APPLICATION

This application is a continuation-in-part of U.S. application Ser. No. 07/965,139, filed Oct. 22, 1992.

BACKGROUND OF THE INVENTION

Internal mold release agents used in the production of molded polyurethane and polyurea products are known. Many of the known internal release agents are based at least in part on fatty acid esters. Typical of such release agents are those described in U.S. Pat. Nos. 3,726,952, 3,925,527, 4,058,492, 4,098,731, 4,201,847, 4,254,228, 4,868,224 and 4,954,537, and British Patent 1,365,215.

U.S. Pat. Nos. 4,519,965 and 4,581,386 describe the use of zinc carboxylates as internal mold release agents for the production of molded polyurethane and/or polyurea elastomers.

More recently developed internal mold release agents are also acidic in nature. Typical of such release agents are those based on polymerized fatty acids, lower alkyl aceto-acetates, and esters of saturated/unsaturated monocarboxylic acid mixtures (U.S. application Ser. Nos. 07/698,069, 07/660,759, and 07/697,153, filed on Apr. 22, 1991, Feb. 25, 1991, and May 8, 1991, respectively).

One recurring problem with all of these acidic internal release agents is that they generally cause an increase in the reactivity of the system, while at the same time causing a reduction in the green strength of the resultant molded product. Green strength is a measure (usually subjective) of the ability of a material to be demolded. Green strength is significantly affected by temperature, mold residence time, and part configuration (i.e., simple shapes demold more easily than complex ones), as well as by polymer recipe. U.S. Pat. No. 4,111,861 discloses acidic additives to facilitate mold release of a RIM system and recognized the increased reactivity caused by such additives (note column 3, lines 30 ff). The reference overcame the reactivity problem by combining the acidic additive with a polar metal compound.

DESCRIPTION OF THE INVENTION

The present invention is directed to the discovery that a relatively small amount of certain tertiary amines can effectively stabilize systems containing acidic internal mold release agents. The so-stabilized systems exhibit excellent green strength. More particularly, the present invention is directed to an improved process wherein a reaction mixture of one or more polyisocyanates, one or more isocyanate reactive compounds and one or more acidic mold release agents is processed in a closed mold via the RIM process, the improvement wherein the reaction mixture contains from 0.5 to 2.6% by weight, and preferably from 1.6 to 2.3% by weight, based upon the total weight of the isocyanate reactive components of a peralkylated polyalkylene polyamine of the following formula:

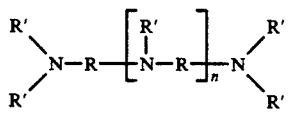

wherein
R' represents a $C_1$ to $C_3$ alkyl group, and, preferably methyl,
R represents a $C_2$ to $C_5$ alkylene group, and, preferably, propylene, and
n is an integer of from 1 to 3, preferably 1.

The tertiary amines useful herein are generally known in the art for catalyzing the reaction between isocyanates and active hydrogen containing compounds. These include pentamethyldiethylene-triamine; bis(dimethylaminopropyl)methylamine, bis(dimethylaminopropyl)ethylamine, bis(dimethylaminopropyl)propylamine, and the like.

The amines are used with RIM systems which contain acidic internal mold release agents.

Acidic Release Agents

Substantially any acidic release agent can be used. Suitable materials are described in U.S. Pat. Nos. 3,726,952, 3,925,527, 4,058,492, 4,098,731, 4,111,861, 4,201,847, 4,254,228, 4,868,224, and 4,954,537, the disclosures of which are herein incorporated by reference. Release agents useful herein comprise substantially any release agent which is acidic in nature. One useful release agent is the reaction product of 1) a polyester (i) having an OH number of from about 40 to about 160, and preferably from about 85 to about 140, (ii) having an acid number of 15 or less, preferably 10 or less, and most preferably less than 3, and (iii) prepared by reacting (a) a polymerized fatty acid with (b) a relatively low molecular weight hydroxy group containing compound, preferably a diol, and 2) a saturated monocarboxylic acid in a COOH to OH equivalent ratio of from about 10:1 to about 1:10, preferably from about 5:1 to about 1:5, and most preferably about 1:1. The polyesters useful herein (i) have OH numbers of from about 40 to about 160, and preferably from about 85 to about 140, (ii) have acid numbers of 15 or less, preferably 10 or less, and most preferably less than 3, and (iii) are prepared by reacting (a) a polymerized fatty acid with (b) a relatively low molecular weight hydroxy group containing compound. Polymerized fatty acids are known in the art. See, e.g., U.S. Pat. Nos. 4,602,079, 4,680,379, 4,853,430 and 4,937,320, the disclosures of which are herein incorporated by reference. As used herein, and as used in the art, the term "polymerized fatty acids" is intended to mean those chosen from the group consisting of the dimers and trimers of unsaturated aliphatic monoacids containing from 8 to 24 carbon atoms, and mixtures thereof. Specific polymerized fatty acids useful herein are commercially available from Unichema International under the trademark "Pripol". Specific commercially available polymerized fatty acids include Pripol 1008, Pripol 1009 and Pripol 1004. The polyesters used are prepared by esterifying the polymerized fatty acids with relatively low molecular weight hydroxy group containing compounds. Such materials are diols, triols and/or polyols. By "relatively low molecular weight" in the context of materials useful to produce the polyesters is meant a molecular weight of less than about 500. Suitable low molecular weight diols and triols include ethylene glycol, propylene glycol, dipropylene glycol, pentane diols, butanediols, hexanediols, glycerol, trimethylolpropane, pentaerythritol, neopentyl glycol, 2,2,4-trimethyl-1,3-pentane diol, addition products of alkylene oxides such as ethylene oxide or propylene oxide with these alcohols, and the like. Neopentyl glycol and 2,2,4-trimethyl-1,3-pentane diol are presently the most preferred hydroxy group containing compounds used to prepare the polyesters herein. Preparation of the polyester is most suitably carried out by the condensation of the diol, triol and/or polyol and acid at temperatures above 100° C., preferably at 120° C. to 220° C., optionally in a vacuum, the process of the elimination of water being continued until the desired hydroxyl and acid numbers have been obtained. The process of esterification may, of course, be catalyzed with acid or basic catalysts and the water may be eliminated by azeotropic distillation. The products prepared and used according to the invention contain predominant amounts of hydroxyl groups and may contain small amounts of carboxylic acid groups. General techniques for the preparation of the polyesters of the type useful herein are generally known and are described in U.S. Pat. Nos. 4,201,847, 4,254,228, and 3,925,527, the disclosures of which are herein incorporated by reference. The polyesters are then reacted with saturated monocarboxylic acids in a COOH to OH equivalent ratio of from about 10:1 to about 1:10, preferably from about 5:1 to about 1:5, and most preferably about 1:1. In general, the preferred monocarboxylic acids are those containing one or more alkyl groups of from 4 to 22 carbon atoms. Most preferred are saturated aliphatic fatty monocarboxylic acids such as stearic acid, isostearic acid, palmitic acid, undecanoic acid, neodecanoic acid, caproic acid, capric acid, myristic acid, pentanoic acid, heptanoic acid, caprylic acid, nonanoic acid, dodecanoic acid, tridecanoic acid, 2-methylbutanoic acid, pivalic acid, 2-ethylhexanoic acid and the like. The reaction of the monocarboxylic acid with the polyester is generally carried out at temperatures of from 40° to 220° C., preferably from 100° to 215° C., under excess pressure, reduced pressure, or, preferably in the substantial absence of pressure. A catalyst is generally added after the water stops distilling over, with dibutyl tin oxide being the preferred catalyst. While the reaction time is dependent upon the nature and amounts of starting materials, reaction times of from 2 to 8 hours are generally sufficient. The reaction is considered complete when the acid number is less than 8 and preferably less than 5.

Also useful as an acidic release agent is the transesterification product of 1) a fatty acid polyester (i) having an OH number of from about 50 to about 550, preferably from about 50 to about 300, and most preferably from about 50 to about 200, (ii) having an acid number of 10 or less, preferably 5 or less, and most preferably less than 1, and 2) a lower alkyl acetoacetate, preferably in a ratio of one mole of acetoacetate per hydroxyl group of the fatty acid polyester. The fatty acid esters useful herein (i) have OH numbers of from about 50 to about 550, preferably from about 50 to about 300, and most preferably from about 50 to about 200, (ii) have acid numbers of 10 or less, preferably 5 or less, and most preferably less than 1. As used herein, the term "fatty acid" is defined as an acid containing one or more alkyl groups of from 8 to 22 carbon atoms. Useful fatty acids include both saturated and unsaturated carboxylic acids. Preferred are aliphatic fatty acids such as octane carboxylic acids, dodecane acids, natural fatty acids such as ricinoleic acid, oleic acid, alaidic acid, stearic acid, isostearic acid, palmitic acid, linoleic acid, linolenic acid, train oil fatty acids, fatty acids obtained from coconut oil, tallow fatty acids or fatty acids obtained by paraffin oxidation, tall oil fatty acids, succinic acid, maleic acid, citric acid, azelaic acid, dodecanoic acid, undecanoic acid, neodecanoic acid, adipic acid or higher dicarboxylic and polycarboxylic acids, oligomerization products of unsaturated carboxylic acids ("dimer acids") and addition products of maleic acid with natural and synthetic oils, and the like. The presently preferred acid is oleic acid. The fatty acid esters used can be prepared by esterifying carboxylic acids with relatively low molecular weight diols, triols and/or polyols. By "relatively low molecular weight" is meant a molecular weight of less than about 500. Suitable low molecular weight diols, triols and polyols include ethylene glycol, propylene glycol, butanediols, hexanediols, glycerol, trimethylolpropane, pentaerythritol, addition products of alkylene oxides such as ethylene oxide or propylene oxide with the above noted alcohols, with amines such as ethylene diamine, and the like. Pentaerythritol is presently the most preferred alcohol used to prepare the polyesters herein. Preparation of the fatty acid esters is most suitably carried out by the condensation of the diol, triol and/or polyol and acid at temperatures above 100° C., preferably at 120° C. to 240° C., optionally in a vacuum, the process of the elimination of water being continued until the desired hydroxyl and acid numbers have been obtained. The process of esterification may, of course, be catalyzed with acid or basic catalysts and the water may be eliminated by azeotropic distillation. General techniques for the preparation of the fatty acid esters of the type useful herein are generally known and are described in U.S. Pat. Nos. 4,201,847, 4,254,228, and 3,925,527, the disclosures of which are herein incorporated by reference. The fatty acid ester is then transesterified with a lower alkyl acetoacetate. In general, the transesterification reaction is conducted at temperatures ranging from 100° to 210° C. for periods of time ranging from 2 to 8 hours. If desired, transesterification catalysts, such as dibutyl-tin oxide and tetrabutyl titanate, can be used. By "lower alkyl" is meant alkyl groups containing from one to five carbon atoms. Specific useful acetoacetates include methyl acetoacetate, ethyl acetoacetate, t-butyl acetoacetate, propyl acetoacetate and the like, with t-butyl acetoacetate being the presently preferred material. In preparing the transesterified product herein, transesterification catalysts may be necessary. In preparing the product, it is generally preferred that the reactants be used in amount such that one OH group is present for each acetoacetate group. However, it is also possible to use excess amounts of either reactant. In fact, in some cases it is preferred to use an excess of the acetoacetate to ensure complete reaction.

Also useful as acidic release agents are esters having acid numbers of 15 or less, and preferably 10 or less, prepared by reacting (a) one mole of a tetrahydroxy compound prepared by reacting one mole of a $C_2$ to $C_8$ alkylene diamine, preferably a $C_2$ or $C_3$ alkylene diamine, with from 4 to 12 moles, and preferably 4 to 6 moles, of an alkylene oxide, with (b) four moles of an acid mixture consisting of at least one saturated monocarboxylic acid and at least one unsaturated monocarboxylic acid, with the molar ratio of saturated to unsaturated acid being from 1:1 to 3:1, and preferably 1:1. The esters useful herein have acid numbers of 15 or less, and preferably 10 or less, and are prepared by reacting certain tetrahydroxy compounds with specific acid mixtures. The amines used to prepare the tetrahydroxy compounds are alkylene diamines of the formula:

where R is a $C_2$ to $C_8$ straight or branched chain alkylene group. Useful diamines include ethylene diamine and the various straight and branched chain isomers of diaminopropane, diaminobutane, diaminopentane, diaminohexane, diaminoheptane, and diaminooctane. Specific useful diamines include 1,2- and 1,3-diaminopropane; 1,3-, 2,3-, and 1,4-diaminobutane; 1,2-diamino-2-methyl propane; 1,5-diaminopentane; 1,4-diamino-1-methylbutane; 1,4-diamino-2-methylbutane; 1,3-diamino-1-ethylpropane; 1,3-diamino-1,1-dimethylpropane; 1,3-diamino-1,2-dimethylpropane; 1,3-diamino-2,2-dimethylpropane; 1,5-diamino-2-methylpentane; 1,6-diaminohexane and the like. It is presently preferred to use ethylene diamine. The tetrahydroxy compounds useful herein are known and are prepared by reacting the above noted diamines with alkylene oxides such as ethylene and propylene oxide. Propylene oxide is the presently preferred alkylene oxide. In general, the tetrahydroxy compounds are prepared by reacting one mole of the diamine with from 4 to 12 moles, preferably from 4 to 6 moles, of the alkylene oxide. It is generally preferred to use the minimum amount of alkylene oxide needed to react with all the hydrogens attached to the nitrogen atoms since it is particularly desirable to maximize the weight of the acid portion of the ester in the release agent herein. Accordingly, it is most preferred to use only four or five moles of the alkylene oxide. The tetrahydroxy compounds are then reacted with a mixture of saturated and unsaturated monocarboxylic acids. In general, the preferred saturated monocarboxylic acids are those containing one or more alkyl groups of from 4 to 22 carbon atoms. Most preferred are saturated aliphatic fatty monocarboxylic acids such as stearic acid, isostearic acid, palmitic acid, undecanoic acid, neodecanoic acid, caproic acid, capric acid, myristic acid, pentanoic acid, heptanoic acid, caprylic acid, nonanoic acid, dodecanoic acid, tridecanoic acid, 2-methyl-butanoic acid, pivalic acid, 2-ethylhexanoic acid and the like. Stearic acid is the presently preferred saturated monocarboxylic acid. In general, the preferred unsaturated monocarboxylic acids are those containing one or more alkyl groups of from 4 to 22 carbon atoms. Most preferred are unsaturated aliphatic fatty monocarboxylic acids such as palmitoleic acid, 10-undecenoic acid, 4-decenoic acid, caproleic acid, myristoleic acid, 5-tetradecenoic acid, lauroleic acid, oleic acid, erucic acid and the like. Oleic acid is the presently preferred unsaturated monocarboxylic acid. The acids may be reacted with the tetrahydroxy compound sequentially or, preferably, as a mixture of the two acids. The reaction of the monocarboxylic acids with the tetrahydroxy compound is generally carried out at temperatures of from 40° to 220° C., preferably from 100° to 215° C., under excess pressure, reduced pressure, or, preferably in the substantial absence of pressure. A catalyst may be added after the water stops distilling over, with dibutyl tin oxide being the preferred catalyst. While the reaction time is dependent upon the nature and amounts of starting materials, reaction times of from 2 to 8 hours are generally sufficient. The reaction is considered complete when the acid number is less than 15 and preferably less than 10. General techniques for the preparation of the esters of the type useful herein are generally known and are described in U.S. Pat. Nos. 4,201,847, 4,254,228, and 3,925,527, the disclosures of which are herein incorporated by reference.

RIM Components

As is known in the art, the RIM process generally utilizes a reaction mixture of various isocyanates and isocyanate-reactive materials.

Starting polyisocyanate components for use in the RIM process include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of these compounds are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3-and -1,4-diisocyanate and mixtures of these isomers. Additional examples are 1-isocyanato-3,3,5-trimethyl-5-isocyanatomethyl cyclohexane (German Auslegeschrift No. 1,202,785, U.S. Pat. No. 3,401,190), 2,4- and 2,6-hexahydrotolylene diisocyanate and mixtures of these isomers. Hexahydro-1,3- and/or -1,4-phenylene diisocyanate; perhydro-2,4'- and/or -4,4'-diphenylmethane diisocyanate; 1,3- and 1,4-phenylene diisocyanate; 1,4- and 2,6-tolylene diisocyanate and mixtures of these isomers are also suitable in the instant invention. Diphenyl-methane-2,4- and/or-4,4-diisocyanate; naphthylene-1,5-diisocyanate; triphenyl methane-4,4',4''-triisocyanate; polyphenyl polymethylene polyisocyanates of the type obtained by condensing aniline with formaldehyde, followed by phosgenation and described, for example, in British Patents 874,430 and 848,671 may also be used in the present invention; m- and p-isocyanatophenylsulfonyl isocyanates according to U.S. Pat. No. 3,454,606; perchlorinated aryl polyisocyanates of the type described, for example, in German Auslegeschrift 1,157,601 (U.S. Pat. No. 3,277,138); polyisocyanates containing carbodiimide groups of the type described in German Patent 1,902,007 (U.S. Pat. No. 3,152,162); diisocyanates of the type described in U.S. Pat. No. 3,492,330; and polyisocyanates containing allophanate groups of the type described, for example, in British Patent 993,890, in Belgian Patent 761,626 and in published Dutch Patent Application 7,102,524 are still further examples of suitable isocyanates. Additionally, polyisocyanates containing isocyanurate groups of the type described, for example, in U.S. Pat. No. 3,001,973; in German Patents 1,022,789; 1,222,067 and 1,027,394 and in German Offenlegungsschriften 1,929,034 and 2,004,408; polyisocyanates containing urethane groups of the type described, for example, in Belgian Patent 752,261 or in U.S. Pat. No. 3,394,164; polyisocyanates containing acylated urea groups according to German Patent 1,230,778 and polyisocyanates containing biuret groups of the type described, for example, in German Patent 1,101,394 (U.S. Pat. Nos. 3,124,605 and 3,201,372) and in British Patent 889,050 are also suitable.

Polyisocyanates produced by telomerization reactions of the type described, for example, in U.S. Pat. No. 3,654,106; polyisocyanates containing ester groups of the type described for example, in British Patents 965,474 and 1,072,956, in U.S. Pat. No. 3,567,763 and in German Patent 1,231,688; reaction products of the above-mentioned isocyanates with acetals according to German Patent 1,072,385 and polyisocyanates containing polymeric fatty acid residues, according to U.S. Pat. No. 3,455,883 are still further examples of suitable isocyanate.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Patent 1,618,380 (U.S. Pat. No. 3,644,457). These may be produced for example, by reacting 1 mol of 4,4'-diisocyanato-diphenylmethane with from 0.05 to 0.3 moles of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Patent 1,092,007 (U.S. Pat. No. 3,152,162). Mixtures of these preferred polyisocyanates can also be used. In general, aliphatic and cycloaliphatic isocyanates are less suitable for the purposes of the instant invention.

Also preferred are the polyphenyl-polymethylene polyisocyanates obtained by the phosgenation of an aniline/formaldehyde condensate.

Also necessary for preparing molded products via the RIM process are isocyanate reactive components. These components may be typically divided into two groups, relatively high molecular weight compounds having a molecular weight of 400 to about 10,000 and low molecular weight compounds, i.e. chain extenders, having a molecular weight of 62 to 399. Examples of suitable high molecular weight compounds include the polyesters, polyethers, polythioethers, polyacetals and polycarbonates containing at least 2, preferably 2 to 8 and most preferably 2 to 4 isocyanate-reactive groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above identified U.S. Patents. Finally, representatives of the many and varied compounds which may be used in accordance with the invention may be found for example in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

So-called "aminopolyethers" may be used in accordance with the present invention as high molecular weight compounds (the molecular weight is always the average molecular weight which may be calculated from the functionality and the content of isocyanate-reactive groups). Such aminopolyethers include those wherein at least about 30 and preferably about 60 to 100 equivalent % of the isocyanate-reactive groups are primary and/or secondary (preferably primary) aromatically or aliphatically (preferably aromatically) bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by methods known per se. For example, polyhydroxypolyethers such as polypropylene glycol ethers may be aminated by reaction with ammonia in the presence of Raney nickel and hydrogen (Belgian Patent 634,741). U.S. Pat. No. 3,654,370 describes the production of polyoxyalkylene polyamines by reaction of the corresponding polyol with ammonia and hydrogen in the presence of a nickel, copper, chromium catalyst. German Patent 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728 and 3,236,895 and French Patent 1,551,605. The production of polyethers containing terminal secondary amino groups is described, for example, in French Patent 1,466,708.

Polyhydroxypolyethers of relatively high molecular weight may be converted into the corresponding anthranilic acid esters by reaction with isatoic acid anhydride, as described, for example, in German Offenlegungsschriften 2,019,432 and 2,619,840 and in U.S. Pat. Nos. 3,808,250, 3,975,428 and 4,016,143. Polyethers containing terminal aromatic amino groups are formed in this way.

According to German Offenlegungsschrift 2,546,536 and U.S. Pat. No. 3,865,791, relatively high molecular weight compounds containing terminal amino groups are obtained by reaction of isocyanate terminated prepolymers based on polyhydroxypolyethers with enamines, aldimines or ketimines containing hydroxyl groups and subsequent hydrolysis.

It is preferred to use amino polyethers obtained by hydrolysis of compounds containing terminal isocyanate groups, for example in accordance with German Offenlegungsschrift 2,948,419 or U.S. Pat. No. 4,515,923, herein incorporated by reference in its entirety. In this process, polyethers most preferably containing 2 to 4 hydroxyl groups are reacted with polyisocyanates to form NCO prepolymers and, in a second step, the isocyanate groups are converted by hydrolysis into amino groups.

Also useful are amino compounds prepared by reacting the corresponding polyol with a halogenated nitrobenzene compound such as o- or p-nitrochlorobenzene, followed by the reduction of the nitro group(s) to the amine as described in U.S. application Ser. No. 183,556, filed on Apr. 19, 1988, and in published European Application 0,268,849, published Jun. 1, 1988. Also useful are amino compounds prepared by reacting an amine with an acetoacetated polyol as described in U.S. application Ser. Nos. 523,769 (filed on May 15, 1990), 524,268 (filed on May 15, 1990), and 562,293 (filed on Aug. 3, 1990).

The "aminopolyethers" used in accordance with the invention are often mixtures of the compounds mentioned by way of example and (on a statistical average) most preferably contain 2 to 4 terminal isocyanate-reactive groups. In the process according to the invention, the "aminopolyethers" may be used in admixture with polyhydroxypolyethers free from amino groups.

In accordance with the present invention, the high molecular weight compounds are used in admixture with from about 5 to about 50% by weight based on the quantity of the high molecular weight active hydrogen containing compound, of low molecular weight chain extenders. Examples of suitable hydroxyl group-containing chain extenders include ethylene glycol, 1,2- and 1,3-propane diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Other suitable chain extenders include aromatic polyamines, preferably diamines, having molecular weights of less than 400, especially the sterically hindered aromatic polyamines, preferably diamines, having molecular weights of less than 400, especially the sterically hindered aromatic diamines which contain at least one linear or branched alkyl substituent in the ortho-position to the first amino group and at least one, preferably two linear or branched alkyl substituents containing from 1 to 4, preferably 1 to 3, carbon atoms in the ortho-position to a second amino group. These aromatic diamines include 1-methyl-3,5-diethyl-2,4-diamino benzene, 1-methyl-3,5-diethyl-2,6-diamino benzene, 1,3,5-trimethyl- 2,4-diamino benzene, 1,3,5-triethyl-2,4-diamino benzene, 3,5,3',5'-tetraethyl-4,4'-diamino diphenylmethane, 3,5,3',5'-tetra-isopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenylmethane, 1-methyl-2,6-diamino-3-isopropylbenzene and mixtures of the above diamines. Most preferred are mixtures of 1-methyl-3,5- diethyl-2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'- and/or 4,4'-diaminodiphenylmethane, 1,2- and 1,4-phenylene diamine, naphthalene-1,5-diamine and triphenylmethane-4,4'4''-triamine. The difunctional and polyfunctional aromatic amine compounds may also exclusively or partly contain secondary amino groups such as 4,4'-di-(methylamino)-diphenylmethane or 1-methyl-2-methylamino-4-amino-benzene. Liquid mixtures of polyphenyl polymethylene-polyamines, of the type obtained by condensing aniline with formaldehyde, are also suitable. Generally, the nonsterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

It is also possible to use surface-active additives such as emulsifiers and foam stabilizers. Examples include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known blowing agents, cell regulators, flame retarding agents, plasticizers, dyes, fillers and reinforcing agents such as glass in the form of fibers or flakes or carbon fibers.

The molded products of the present invention are prepared by reacting the components in a closed mold. The compositions according to the present invention may be molded using conventional processing techniques at isocyanate indexes ranging from as low as 90 to as high as 400 (preferably from 95 to 115) and are especially suited for processing by the RIM process. In general, two separate streams are intimately mixed and subsequently injected into a suitable mold, although it is possible to use more than two streams. The first stream contains the polyisocyanate component, while the second stream contains the isocyanate reactive components and any other additive which is to be included. The internal release agent is generally added to the isocyanate reactive components.

The invention is further illustrated but is not intended to be limited by the following examples in which all parts and percentages are by weight unless otherwise specified.

EXAMPLES

IMR 1: A twelve liter flask was charged with 2181 parts of a tetrol (the tetrol was a commercially available material sold as Multranol 4050 by Miles Inc.; Multranol 4050 is a reaction product of ethylene diamine and propylene oxide having an OH number of about 630). Nitrogen was bubbled through the flask and the temperature was raised to 130° C. 3484 parts of stearic acid and 3459 parts of oleic acid were slowly added with stirring. The temperature was raised to 215° C. after the addition of the acids was complete. Water was collected in a receiving flask. When the water stopped distilling over, vacuum was slowly applied to the system, and more water was distilled over (a total of 415 parts of water was collected). Full vacuum was then applied for about two hours and samples withdrawn for acid number analysis by titration. The reaction sequence was monitored by InfraRed analysis. Disappearance of the hydroxyl absorbance signalled the end of the reaction. The final product had an acid number of 6.6.

IMR-2: The identical process was followed with the identical materials and amounts of materials as used to produce IMR-1. The final product had an acid number of 7.07.

IMR-3: The identical process was followed with the identical materials and amounts of materials as used to produce IMR-1. The final product had an acid number of 7.6.

IMR-4: A twelve liter flask was charged with 2750 parts of 2,2,4-trimethyl-1,3-pentane diol. Nitrogen was bubbled through the flask and the temperature was raised to 160° C. 6025 parts of Pripol 1009 dimer acid (commercially available from Unichema International) were slowly added with stirring. The temperature was raised to 220° C. after the addition of the dimer acid was complete. Water was collected in a receiving flask. When the water stopped distilling over, vacuum was slowly applied to the system, and more water was distilled over (a total of 375 parts of water was collected). The resultant polyester had an acid number of 2.6 and a hydroxyl number of 102. 5000 parts of the polyester were charged to a twelve liter flask and the temperature was raised to 120° C. 3016 parts of stearic acid were added slowly to the rapidly stirred polyester. After the addition was complete, the temperature was raised to 215° C. Water was collected in the receiving flask. After the atmospheric cycle, 2 parts of dibutyl tin oxide were added and vacuum slowly applied. 190 parts of water were collected. Full vacuum was applied and samples withdrawn for acid number analysis. The final product had an acid number of about 8.

IMR-5: A twelve liter flask was charged with 2400 parts of neopentyl glycol. Nitrogen was bubbled through the flask and the temperature was raised to 160° C. 6657 parts of Pripol 1009 dimer acid (commercially available from Unichema International) were slowly added with stirring. The temperature was raised to 220° C. after the addition of the dimer acid was complete. Water was collected in a receiving flask. When the water stopped distilling over, vacuum was slowly applied to the system, and more water was distilled over (a total of 412 parts of water was collected). The resultant polyester had an acid number of 0.5 and a hydroxyl number of 132. 5000 parts of the polyester were charged to a twelve liter flask and the temperature was raised to 120° C. 3016 parts of stearic acid were added slowly to the rapidly stirred polyester. After the addition was complete, the temperature was raised to 215° C. Water was collected in the receiving flask. After the atmospheric cycle, 2 parts of dibutyl tin oxide were added and vacuum slowly applied. 190 parts of water were collected. Full vacuum was applied and samples withdrawn for acid number analysis. The final product had an acid number of about 8.

RIM EXAMPLES In the RIM examples, the following materials were used:

POLYOL A: a 28 OH number polyether prepared by reacting glycerin with a mixture of propylene oxide and ethylene oxide (weight ratio of propylene oxide to ethylene oxide of about 5:1) and having a primary OH group content of about 88%.

POLYOL B: a reaction product of ethylene diamine and propylene oxide having an OH number of about 630.

DETDA: an 80/20 mixture of 1-methyl-3,5-diethyl-2,4- and -2,6-phenyl diamine.

ZNS: zinc stearate.

DMT: dimethyltin dilaurate.

DBT: dibutyltin dilaurate.

TED: a 33% solution of triethylene diamine in dipropylene glycol.

L5304: a silicone surfactant available from Union Carbide.

ISO: Mondur PF, available from Miles Inc.; a liquid isocyanate, having an NCO content of about 23%, prepared by reacting tripropylene glycol with 4,4'-diphenylmethane diisocyanate.

MGF: milled glass fibers available from Owens Corning Fiberglas Corporation

PC-77: Polycat 77, available from Air Products; a tertiary amine of the general formula:

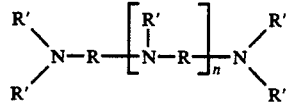

where n=1, R'=methyl, and R=propylene.

PC-15: Polycat 15, identical to PC-77, except that the middle nitrogen is substituted with hydrogen instead of methyl.

RIM plaques were prepared using a laboratory piston metering unit and clamping unit. The metering unit was a two component instrument having a metering capacity of 0.6 liters. A 300 mm×200 mm×4 mm rectangular mold was used to mold the samples. The mold was first stripped with a mold cleaner (N-methyl pyrrolidinone), then soaped with Chemtrand 2006 (available from Chemtrend), and buffed twice. An aluminum transducer plate (5.5 mm radius) was connected to a force transducer mounted in the lid of the mold. The plate was soaked in DMF for an hour, polished with fine steel wool, rinsed with water, and then rinsed with acetone. A RIM shot was then made, and after 45 seconds, the lid of the mold was slowly opened. The maximum force to pull the transducer plate from the molded plaque is the release force. The lower the number, the easier the release. In the following Table 1, the components listed under the heading "B-Side" were first mixed and were processed with the "A-Side" (i.e., the isocyanate). The following molding conditions were used:

| | |
|---|---|
| Mold Temperature: | 65° C. |
| B-Side Temperature: | 45° C. |
| A-Side temperature: | 45° C. |

To assess the green strength, a molded panel (300 mm×200 mm×4 mm) was folded in half twice. If the part showed no breakage, the green strength was deemed excellent. The formulations used are reported in Table 1, while the results obtained are reported in Table 2. Examples 1, 7, 16, 17 and 20 are comparative examples.

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| B-Side | | | | | | | | | | | | |
| Polyol A | 78.3 | 73.3 | 71.3 | 73.3 | 73.3 | 71.8 | 71.3 | 70.9 | 68.8 | 66.8 | 68.65 | 70.8 |
| DETDA | 16.5 | 18 | 18 | 18 | 18 | 16.5 | 16.5 | 18 | 20 | 20 | 18 | 18 |
| Polyol B | 3 | | | | | 3 | 3 | | | | | |
| ZNS | 2 | | | | | | | | | | | |
| DBT | .1 | | | | | | | | | | | |
| DMT | | .1 | .1 | .1 | .1 | .1 | .1 | .1 | .1 | .1 | .1 | .1 |
| TED | .1 | .1 | .1 | .1 | .1 | .1 | .1 | | .1 | .1 | | .1 |
| L-5304 | | 1.0 | 1.0 | 1.0 | 1.0 | 1.0 | 1.0 | 1.0 | 1.0 | 1.0 | 1.0 | 1.0 |
| PC77 | | 1.5 | 1.5 | 1.5 | 1.5 | 1.5 | | 2 | 2 | 2 | 2.25 | 2 |
| MGF | | | | 25.89 | | | | | | | | |
| IMR 3 | | 6 | 8 | 6 | 6 | 6 | 8 | 8 | 8 | 10 | 10 | 8 |
| % by wt. Polyamine (based on total wt. of NCO-reactive components) | 0 | 1.6 | 1.7 | 1.6 | 1.6 | 1.6 | 0 | 2.2 | 2.2 | 2.3 | 2.6 | 2.2 |
| A-Side Iso | 50.5 | 46.7 | 46.5 | 37.1 | 46.7 | 49.9 | 49.8 | 46.3 | 50.7 | 50.5 | 46.1 | 46.5 |

| | Example | | | | | | | | | |
|---|---|---|---|---|---|---|---|---|---|---|
| | 13 | 14 | 15 | 16 | 17 | 18 | 19 | 20 | 21 | 22 |
| B-Side | | | | | | | | | | |
| Polyol A | 71.05 | 71.05 | 71.55 | 71.55 | 72.05 | 72.05 | 72.05 | 70.8 | 69.3 | 69.3 |
| DETDA | 16.5 | 16.5 | 16.5 | 16.5 | 16.5 | 16.5 | 16.5 | 16.5 | 16.5 | 16.5 |
| Polyol B | 3 | 3 | 3 | 3 | 3 | 3 | 3 | 3 | 3 | 3 |
| DBT | | | | | | .05 | .05 | | | |
| DMT | .1 | .1 | .1 | .1 | .1 | .05 | .05 | .1 | .1 | .1 |
| TED | .1 | .1 | .1 | .1 | .1 | .1 | .1 | .1 | .1 | .1 |
| L-5304 | .25 | .25 | .25 | .25 | .25 | .25 | .25 | .5 | 1.0 | 1.0 |
| PC77 | 1.0 | 1.0 | .5 | | | .25 | .25 | | 2 | 2 |
| PC15 | | | | 1.0 | | | | | | |
| IMR1 | 8 | | | | | | | | 8 | 8 |
| IMR4 | | 4 | 4 | 4 | 4 | 4 | 4 | | | |
| IMR5 | | 4 | 4 | 4 | 4 | 4 | 4 | | | |
| IMR2 | | | | | | | | | | 8 |
| % by weight Polyamine (based on total wt. of NCO-reactive components) | 1.1 | 1.1 | 0.5 | 0 | 0 | 0.3 | 0.3 | 0 | 2.2 | 2.2 |
| A-Side Iso | 49.8 | 49.8 | 49.9 | 49.8 | 49.9 | 49.8 | 49.8 | 49.8 | 49.6 | 49.6 |

TABLE 2

| Examples | Green Strength | |
|---|---|---|
| 1 | 200 after 10 shots | Excellent |
| 2 | 550 after 18 shots | Excellent |
| 3 | 600 after 10 shots | Excellent |
| 4 | 300 after 15 shots | Excellent |
| 5 | 300 after 14 shots | Excellent |
| 6 | 300 after 9 shots | Excellent |
| 7 | 600 after 9 shots | Poor |
| 8 | 500 after 11 shots | Excellent |
| 9 | 450 after 15 shots | Excellent |
| 10 | 400 after 16 shots | Excellent |
| 11 | 400 after 16 shots | Excellent |
| 12 | 400 after 15 shots | Excellent |
| 13 | 400 after 18 shots | Excellent |
| 14 | 700 after 7 shots | Excellent |
| 15 | 700 after 7 shots | Excellent |
| 16 | 700 after 5 shots | Excellent |
| 17 | 700 after 5 shots | Poor |
| 18 | 700 after 5 shots | Excellent |
| 19 | 700 after 5 shots | Excellent |
| 20 | 500 after 18 shots | Poor |
| 21 | 450 after 20 shots | Excellent |

TABLE 2-continued

| Examples | Green Strength | |
|---|---|---|
| 22 | 550 after 18 shots | Excellent |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process wherein a reaction mixture of one or more polyisocyanates, one or more isocyanate reactive compounds and one or more acidic mold release agents is processed in a closed mold via the RIM process, the improvement wherein the reaction mixture contains from 0.5 to 2.6% by weight, based upon the total weight of the isocyanate reactive components, of a peralkylated polyalkylene polyamine of the following formula:

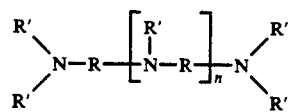

wherein
R' represents a $C_1$ to $C_3$ alkyl group,
R represents a $C_2$ to $C_5$ alkylene group, and,
n is an integer of from 1 to 3.

2. The process of claim 1, wherein R' represents a methyl group, R represents a propylene group, and n is 1.

3. The process of claim 1, wherein the amount of said polyamine is from 1.6 to 2.3% by weight.

* * * * *